US008985347B2

(12) United States Patent
Thompson

(10) Patent No.: US 8,985,347 B2
(45) Date of Patent: Mar. 24, 2015

(54) LINEAR SPICE RACK

(76) Inventor: Alan S. Thompson, Kelley, IA (US)

( * ) Notice: Subject to any disclaimer, the term of this patent is extended or adjusted under 35 U.S.C. 154(b) by 0 days.

(21) Appl. No.: 13/553,975

(22) Filed: Jul. 20, 2012

(65) Prior Publication Data

US 2013/0026121 A1 Jan. 31, 2013

Related U.S. Application Data

(60) Provisional application No. 61/513,067, filed on Jul. 29, 2011.

(51) Int. Cl.
*A47B 73/00* (2006.01)
*B65D 21/024* (2006.01)
*A47J 47/16* (2006.01)

(52) U.S. Cl.
CPC ....................... *A47J 47/16* (2013.01)
USPC .......... 211/74; 211/85.18; 220/23.4; 206/144

(58) Field of Classification Search
CPC ............... A47B 87/007; A47B 87/008; B65D 21/0202; B65D 21/0204; B65D 71/0003; B65D 71/50; B65D 71/502
USPC ..................... 211/59.4, 74, 75, 76, 77, 85.18; 248/68.1, 70, 223.41, 309.1, 311.2, 248/314; 220/23.2, 23.4, 23.8, 23.83; 294/160, 162; 206/145, 154, 159, 162, 206/203, 427, 428, 429, 430, 431, 443, 446, 206/504; 312/45
See application file for complete search history.

(56) References Cited

U.S. PATENT DOCUMENTS

| | | | | | |
|---|---|---|---|---|---|
| 2,637,475 | A | * | 5/1953 | Gialanella | 294/159 |
| 2,879,100 | A | * | 3/1959 | Moore | 294/87.2 |
| 3,028,189 | A | * | 4/1962 | Gialanella | 294/87.2 |
| 3,131,829 | A | * | 5/1964 | Masser | 206/144 |
| 3,233,804 | A | * | 2/1966 | Dahm | 294/160 |
| 3,404,805 | A | * | 10/1968 | Stockman et al. | 206/144 |
| 3,599,828 | A | * | 8/1971 | Conway et al. | 294/160 |
| 3,628,709 | A | * | 12/1971 | Clifton | 294/160 |
| 3,727,752 | A | * | 4/1973 | Poupitch | 206/144 |
| RE27,705 | E | * | 7/1973 | Rockett | 206/150 |
| 3,751,098 | A | * | 8/1973 | Owen | 294/87.2 |
| 3,759,596 | A | * | 9/1973 | Bergmeyer et al. | 312/108 |
| 3,951,259 | A | * | 4/1976 | Oglesbee | 206/164 |
| 4,542,930 | A | * | 9/1985 | Adams | 294/160 |
| 4,560,064 | A | * | 12/1985 | Peterson et al. | 206/159 |
| 4,889,245 | A | * | 12/1989 | Rinke | 211/49.1 |
| 4,940,137 | A | * | 7/1990 | Straub | 206/139 |
| 4,944,924 | A | * | 7/1990 | Mawhirt et al. | 422/562 |
| 5,092,456 | A | * | 3/1992 | Straub | 206/144 |
| 5,191,975 | A | * | 3/1993 | Pezzoli et al. | 206/151 |
| 5,221,002 | A | * | 6/1993 | Garganese | 206/151 |
| 5,378,433 | A | * | 1/1995 | Duckett et al. | 422/562 |
| 5,397,542 | A | * | 3/1995 | Nelms et al. | 422/562 |
| 5,415,277 | A | * | 5/1995 | Berntsen | 206/144 |
| D382,346 | S | * | 8/1997 | Buhler et al. | D24/227 |
| 6,149,872 | A | * | 11/2000 | Mack et al. | 422/554 |

(Continued)

*Primary Examiner* — Joshua Rodden
(74) *Attorney, Agent, or Firm* — McKee, Voorhees & Sease

(57) ABSTRACT

A spice rack is adapted to hold a plurality of spice containers. The rack includes opposing back-to-back rows of compartments, with each compartment having resilient sidewalls for holding at least one spice container. The back-to-back pairs of compartments are integrally formed, with laterally adjacent pairs of compartments having mating edges which couple together. Any number of compartments can be added so that the rack has any desired linear length.

7 Claims, 6 Drawing Sheets

(56) References Cited

U.S. PATENT DOCUMENTS

| | | | |
|---|---|---|---|
| 8,020,259 B2* | 9/2011 | Ho et al. ................. 24/129 R |
| 2003/0044323 A1* | 3/2003 | Diamond et al. ............ 422/102 |
| 2004/0112767 A1* | 6/2004 | Ozcan .......................... 206/162 |
| 2011/0114802 A1* | 5/2011 | Hjerpe ........................ 248/68.1 |

* cited by examiner

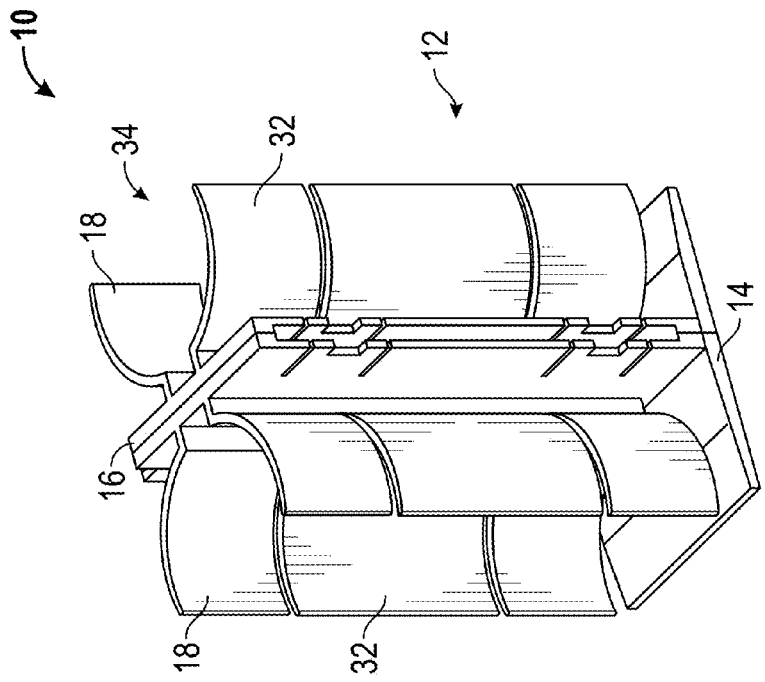
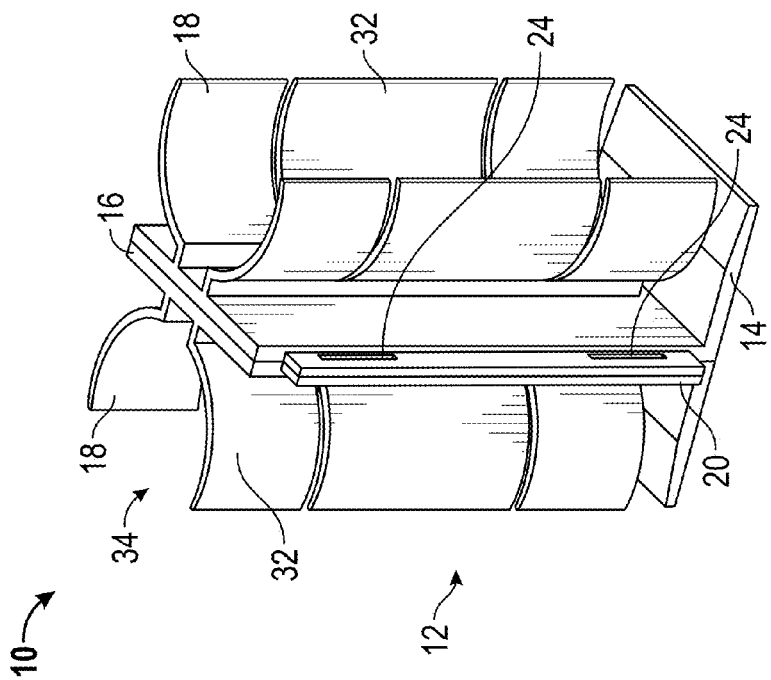

LINEAR SPICE RACK

CROSS-REFERENCE TO RELATED APPLICATIONS

This application claims priority under 35 U.S.C. §119 to provisional application Ser. No. 61/513,067 filed Jul. 29, 2011, herein incorporated by reference in its entirety.

BACKGROUND OF THE INVENTION

Spice racks having various designs have been known for many years. One popular design is a carousel-style spice rack having a rotatable carriage with multiple compartments for holding the spice jars or bottles. However, such carousel spice racks may not fit in some kitchen cabinets or drawers, particularly if only a narrow space is available. The diameter of a carousel rack also limits where such a rack can sit on kitchen counter tops having limited space.

Accordingly, a primary objective of the present invention is the provision of a spice rack for holding a plurality of spice containers, yet having a narrow profile.

Another objective of the present invention is the provision of a non-carousel spice rack for holding spice bottles and jars.

Still another objective of the present invention is the provision of a spice rack having a plurality of linearly aligned spice container compartments.

A further objective of the present invention is the provision of a straight line spice rack having a plurality of spice container compartments.

Yet another objective of the present invention is the provision of a spice rack assembly having multiple compartments joined together at adjacent edges.

Another objective of the present invention is the provision of a linear spice rack assembly wherein multiple compartments can be coupled together to form any desired length.

Another objective of the present invention is the provision of a spice rack having multiple compartments which are joined by male and female connectors.

Still another objective of the present invention is the provision of a spice rack assembly having compartments joined by tongue and groove connectors.

A further objective of the present invention is the provision of a spice rack having multiple compartments which are press fit together.

Yet another objective of the present invention is the provision of a spice rack assembly having opposite back to back spice container compartments.

Another objective of the present invention is the provision of a spice rack assembly having two adjacent rows of compartments.

A further objective of the present invention is the provision of a non-rotatable spice rack which can be set horizontally or vertically.

Another objective of the present invention is provision of a spice rack which is economically manufactured and durable in use.

These and other objectives will become apparent from the following description of the invention.

SUMMARY OF THE INVENTION

A spice rack of the present invention includes a plurality of spice container compartments which are aligned linearly. In the preferred embodiment, two back-to-back rows of compartments are formed with each back-to-back adjacent compartments being an integral pair. Laterally adjacent compartments are joined together at mating edges which have a male and female or tongue and groove press fit assembly. Each spice compartment has a cylindrical sidewall with opposite spaced apart edges defining a gap through which a spice container can be snap fit into the compartment. Each compartment can hold two vertically stacked small spice containers or a single tall spice container.

BRIEF DESCRIPTION OF THE DRAWINGS

FIG. 4 is a perspective view of one spice rack section.
FIG. 5 is another perspective view of a spice rack section.

DETAILED DESCRIPTION OF THE PREFERRED EMBODIMENTS

Figure 2:
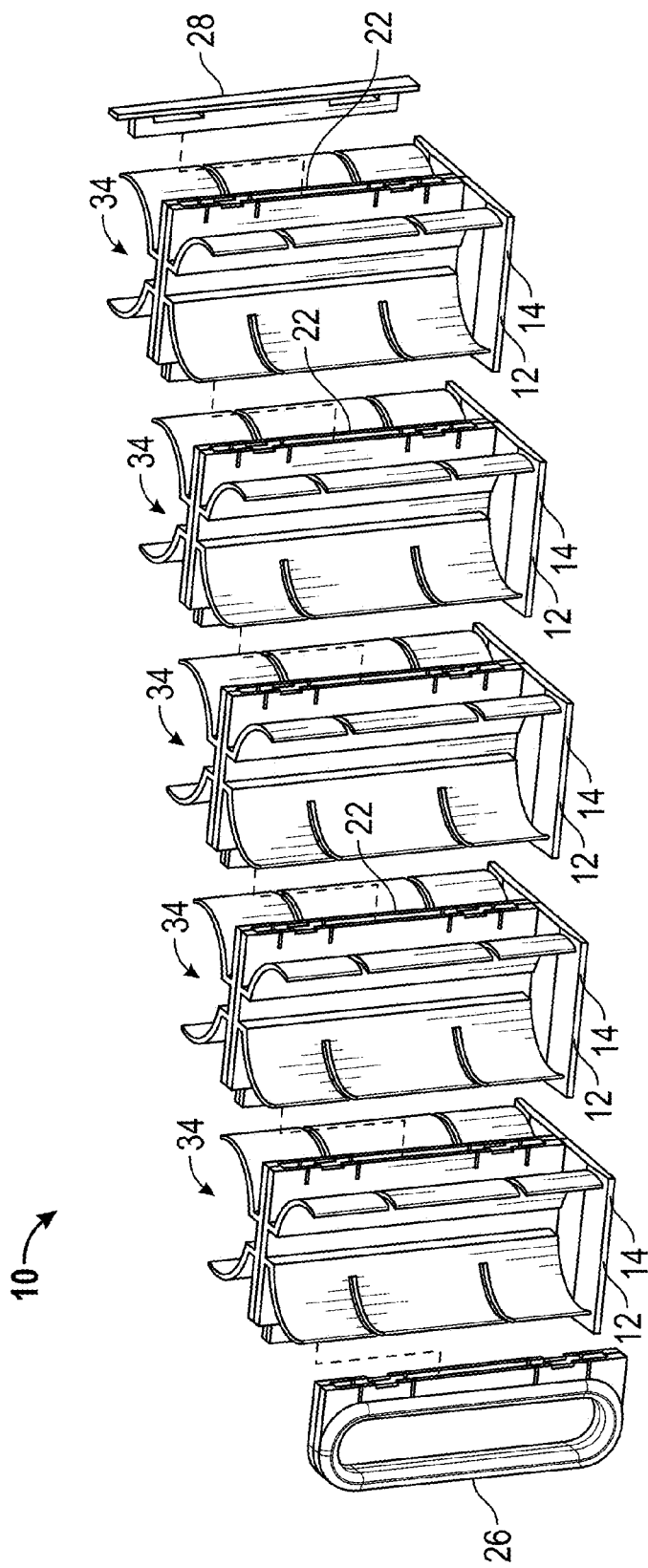
FIG. 2 is an exploded view of the spice rack sections.
Figure 3:
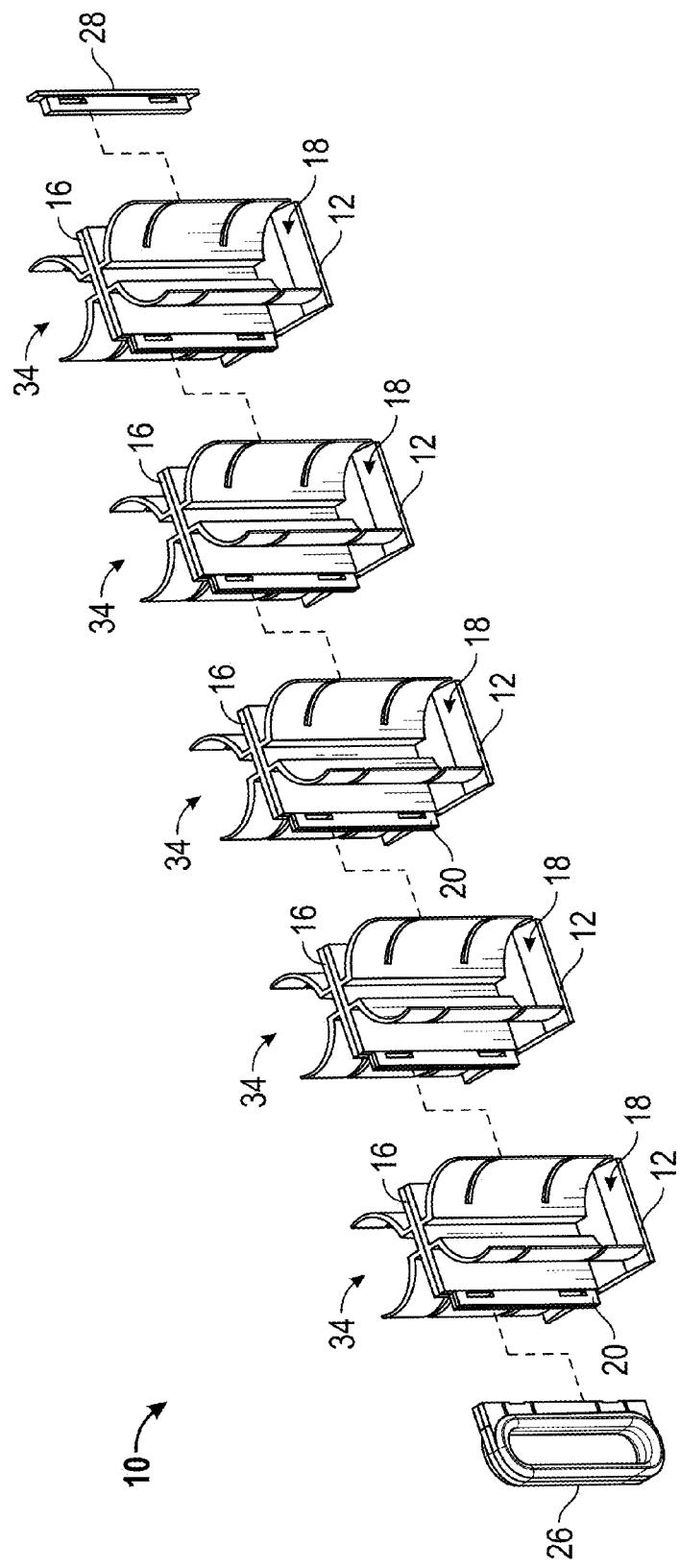
FIG. 3 is another exploded view of the spice rack sections.
Figure 7:
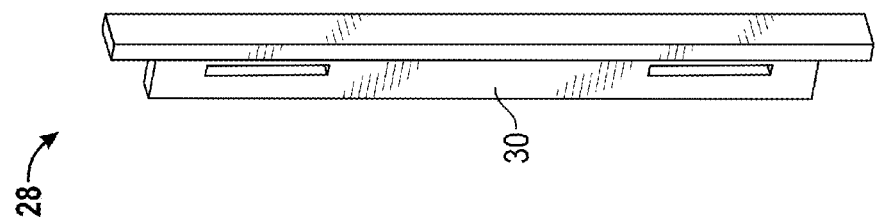
FIG. 7 is a perspective view of an end cap for the spice rack according to the present invention.
Figure 6:
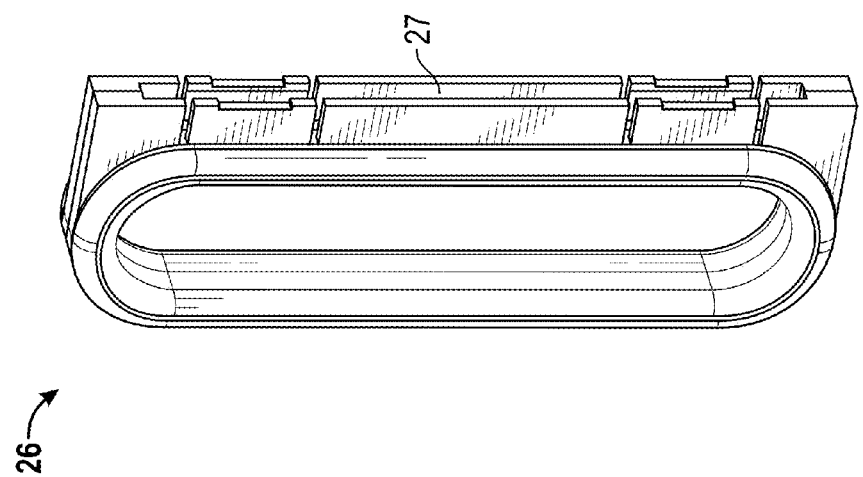
FIG. 6 is a perspective view of the spice rack handle according to the present invention.

The spice rack of the present invention is generally designated by the reference numeral 10 in the drawings. The rack 10 includes a plurality of sections 12, as seen in FIGS. 2 and 3. As shown in FIGS. 4 and 5, each section 12 includes a base 14, a central wall 16, and opposite compartments 18 on the opposite front and rear faces of the wall 16. Each pair of back-to-back compartments is preferably molded as an integral unit. Alternatively, each pair of compartments can be adhered together back-to-back or adhered to a central panel or wall. Preferably, the base 14 is integrally formed on each compartment 18.

The wall 16 has opposite lateral edges, with one edge having a male connecter 20 and the other edge having a female receptor 22. Laterally adjacent sections 12 are adapted to be quickly and easily joined together by a simple press fit via the tongue and groove assembly of the male connecter 20 in the female receptor 22 on adjacent sections 12. As seen in FIG. 4, the male connecter 20 may have one or more slots 24 adapted to receive a detent in the female receptor 22 and thereby lock the mating edges of adjacent sections 12 together. It is understood that the detent and slots can have different shapes and can be reversed on the male and female components. Also, the male and female connectors 20, 22 may have different dimensions and shapes from that shown in the drawings.

Figure 8:
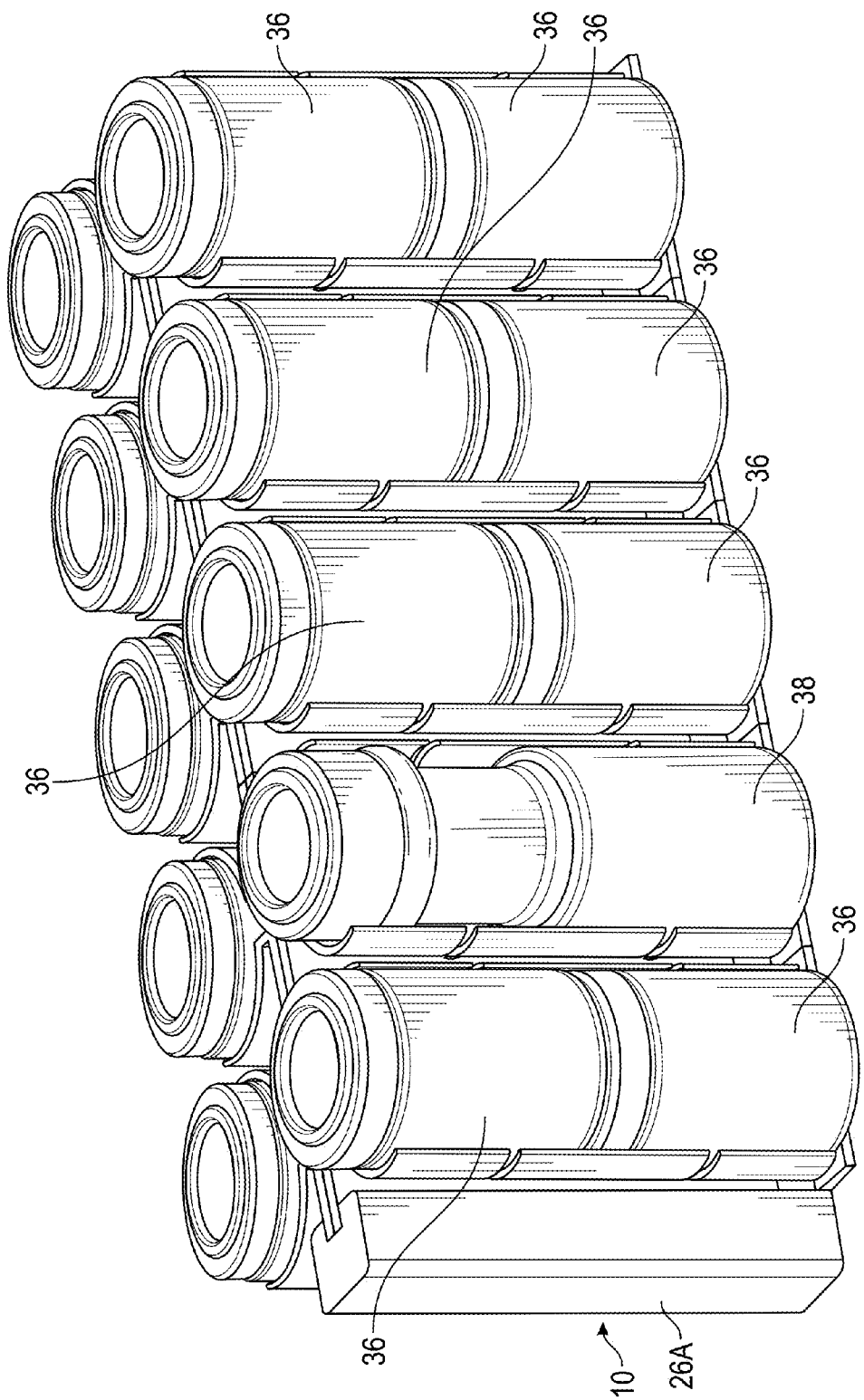
FIG. 8 is a perspective view of the spice rack with spice containers mounted in the rack.

The rack 10 includes a handle 26 on one end and an end cap 28 on the opposite end. The handle 26 has a female slot 27 for receiving the male connecter 20 of the end section 12. An alternative handle 26A is shown in FIG. 8. The end cap 28 has a male connecter 20 of the end section 12. The end cap 28 has a male connecter 30 to receive in the female receptor 22 of the opposite end section 12. It is understood that the handle 26 and end cap 28 could be reversed by having a male connecter on the handle and a female receptor on the end cap. Also, the end cap 28 may be formed with a wider dimension, as compared to that shown in the drawings, such that the rack 10 could be stood upwardly or vertically on end, as opposed to being set horizontally on the base 14.

Each compartment 18 includes a semi-cylindrical sidewall 32 which extends at least 180° and preferably slightly more than 180°. The inside diameter of each compartment 18 is slightly larger than the outside diameter of the spice containers. The opposite lateral edges of the sidewall 32 of each compartment define an opening or gap 34 through which a spice container passes for snap fit receipt in the compartment 18. In the preferred embodiment shown in the drawings, each compartment 18 has a height corresponding to two commercially available mini spice containers 36, such as those sold by McCormick® or Tones®. The compartments 18 will also hold taller spice jars or bottles 38, similar to those sold by McCormick® or Tones®. The resiliency of the compartment arms allows quick and easy snap fit insertion and removal of these commercially available spice containers to and from the compartments 18.

Figure 1:
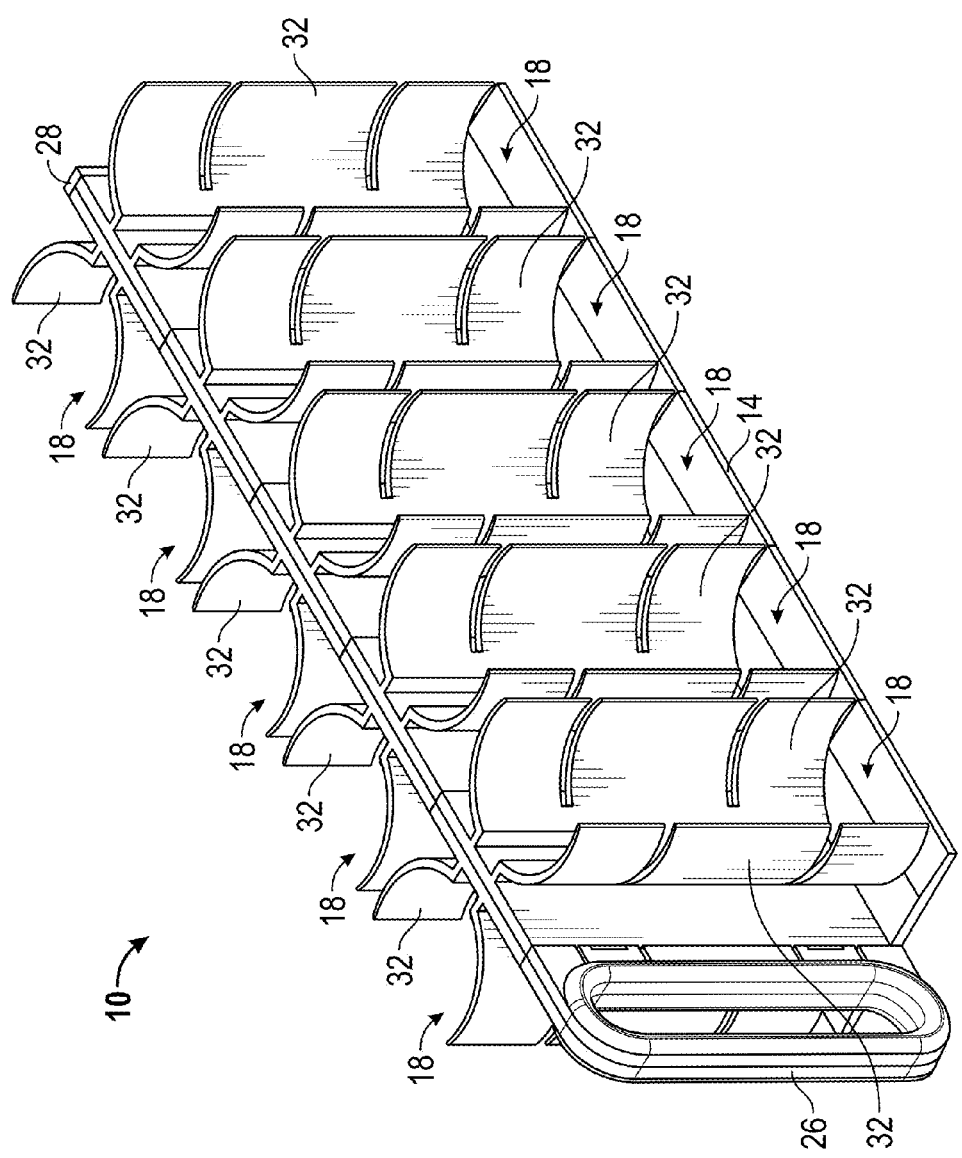
FIG. 1 is a perspective view of the spice rack according to the present invention.

The drawings show the spice rack 10 as having five sections 12. However, more or less sections can be connected together, as needed for a particular kitchen cabinet, shelf, or counter top. Alternative embodiments are also contemplated, such as a one piece, molded rack, similar to that shown in FIG. 1, but without separate sections. Also, a rack similar to FIG. 1 can be provided with compartments on only one side of the wall 16, rather than on both sides of the wall. It is further understood that the racks 10 can be stacked one upon the other, with the base 14 of the upper rack resting upon the top edges of the compartments of the lower rack.

The base 14 forms a floor for each compartment 18 to support the lowermost spice container in the compartment, particularly when the rack is moved to and from a kitchen cabinet or storage area. The base 14 may extend continuously across all the compartments 18, or may be separately formed in each compartment.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A spice rack for holding a plurality of spice containers, comprising:
   first and second planar central members each having opposite front and back sides;
   front and back compartments on the front side and on the back side of each central member, respectively, each compartment being adapted to hold at least one spice container;
   each compartment have a cylindrical sidewall with opposite spaced apart resilient edges defining an expandable gap through which a spice container is adapted to snap fit so that the sidewall grips the spice container;
   the central members having mating edges for selectively joining the central members together to form two rows of the compartments; and
   a handle on one of the central members extending laterally beyond the compartments.

2. The spice rack of claim 1 wherein the front and back compartments of each respectively planar member are formed as an integral pair.

3. The spice rack of claim 1 wherein the mating edges have a male and female connection.

4. The spice rack of claim 1 wherein the mating edges have a tongue and groove coupling.

5. The spice rack of claim 1 wherein the mating edges are press fit together.

6. The spice rack of claim 1 wherein the mating edges have a detent connection.

7. The spice rack of claim 1 further comprising a base on each central member to support the rack on a support surface while the compartments hold the spice containers.

* * * * *